Figure 1:
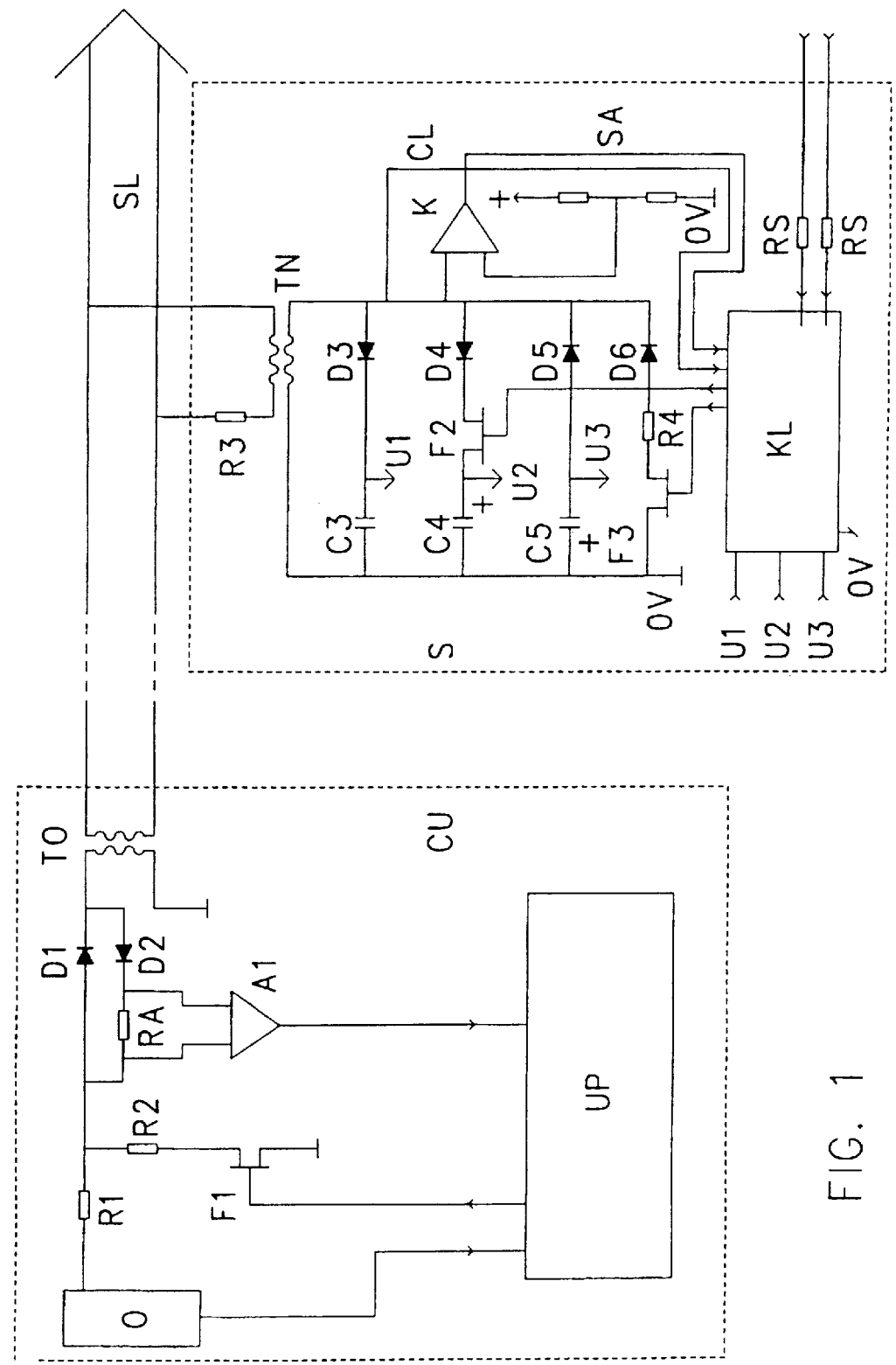

United States Patent
Gotaas

[11] Patent Number: 6,111,918
[45] Date of Patent: Aug. 29, 2000

[54] TWO-WAY DATA COMMUNICATING METHOD AND SYSTEM

[76] Inventor: Einar Gotaas, Blindernveien 72B, N-0373 Oslo, Norway

[21] Appl. No.: 08/930,724
[22] PCT Filed: Apr. 2, 1996
[86] PCT No.: PCT/NO96/00076
  § 371 Date: Oct. 3, 1997
  § 102(e) Date: Oct. 3, 1997
[87] PCT Pub. No.: WO96/31955
  PCT Pub. Date: Oct. 10, 1996

[30] Foreign Application Priority Data

Apr. 4, 1995 [NO] Norway ..................................... 951291
Jun. 7, 1995 [NO] Norway ..................................... 951291

[51] Int. Cl.[7] .............................. H04B 3/00; H04L 25/00
[52] U.S. Cl. ........................... 375/257; 375/259; 327/50; 327/108; 326/30; 333/24 R; 379/402
[58] Field of Search ..................................... 375/257, 259; 327/50, 51, 66, 108; 326/30; 333/24 R; 379/402, 391

[56] References Cited

U.S. PATENT DOCUMENTS

| | | | |
|---|---|---|---|
| 2,378,326 | 6/1945 | Rees et al. ................................ | 179/2.5 |
| 4,086,569 | 4/1978 | Pitches et al. ........................... | 340/167 |
| 4,326,287 | 4/1982 | Abramson ................................. | 370/29 |
| 4,477,896 | 10/1984 | Aker ........................................ | 370/24 |
| 4,740,952 | 4/1988 | Vernieres et al. ........................ | 370/24 |
| 4,806,905 | 2/1989 | McGowan, III et al. ................. | 375/259 |
| 4,949,359 | 8/1990 | Voillat ..................................... | 375/354 |
| 5,089,974 | 2/1992 | Demeyer et al. ........................ | 364/492 |
| 5,257,160 | 10/1993 | Yokohama et al. ..................... | 361/246 |
| 5,400,017 | 3/1995 | Yoshisaka et al. ................ | 340/825.06 |
| 5,687,192 | 11/1997 | Meyer et al. ........................... | 375/259 |
| 5,912,924 | 6/1999 | Dreyer et al. .......................... | 375/257 |
| 5,926,509 | 7/1999 | Stewart et al. ......................... | 375/257 |

FOREIGN PATENT DOCUMENTS

| | | |
|---|---|---|
| 386659 | 3/1990 | European Pat. Off. . |
| 368465 | 5/1990 | European Pat. Off. . |
| 421471 | 10/1990 | European Pat. Off. . |
| 6-132858 | 5/1994 | Japan . |
| 1153908 | 6/1969 | United Kingdom . |
| 1341025 | 12/1973 | United Kingdom . |
| 2130457 | 5/1984 | United Kingdom . |
| WO 9308652 | 4/1993 | WIPO . |
| WO 94/14026 | 6/1994 | WIPO . |
| WO 96/31955 | 10/1996 | WIPO . |

*Primary Examiner*—Chi H. Pham
*Assistant Examiner*—Bryan Webster
*Attorney, Agent, or Firm*—Thomas J. Engellenner; Nutter, McClennen & Fish, LLP

[57] ABSTRACT

A plurality of stations (S), for instance measuring probes, preferably comprising respective microprocessors (KL), are connected successively to a common two-wire line (SL). Supply voltages and synchronization signals are distributed through this line (SL) from a central unit (CU), and at the same time a full duplex communication between single stations (S) and the central unit (CU) is enabled.

18 Claims, 4 Drawing Sheets

TWO-WAY DATA COMMUNICATING METHOD AND SYSTEM

The present invention relates to a method and a means for two-way data communication between a central unit and a number of stations, and the communication takes place via a single two-wire line, with the central unit and the stations places successively along the line.

On example of a more specified system, is a system for collecting measurement values from a number of stations having sensors or measuring probes which monitor electrical/physical parameters. However, a station lay also be a control unit which in addition to the monitoring function, also controls parameters of a system attached to the station. In addition to the transmission of information from one single station to the central unit, it is also possible to put the system in a mode where information from one station can be transmitted to another station.

A more specific example of utilization of the invention, is monitoring of voltage and temperature in lead accumulators in a submarine or electrical emergency batteries in power plants, telecom or similar installations. It is a common feature in such uses that the accumulator cells are placed together as a battery of cells in a room which is classified as explosive.

However, as a principle, the present invention represents a quite general system for, using many stations attached to the same two-wire line, both transmitting and receiving signals between a common central unit, hereafter also referred to as "group interface", and single stations connected to the two-wire line, possibly also signals between the stations. In important embodiments care has been taken to provide galvanic separation, i.e. no direct DC connection, between the various units and between the units and the line. In further important embodiments, supply voltage and timing signals are also provided to the single stations via the two-wire line.

Figure 2:
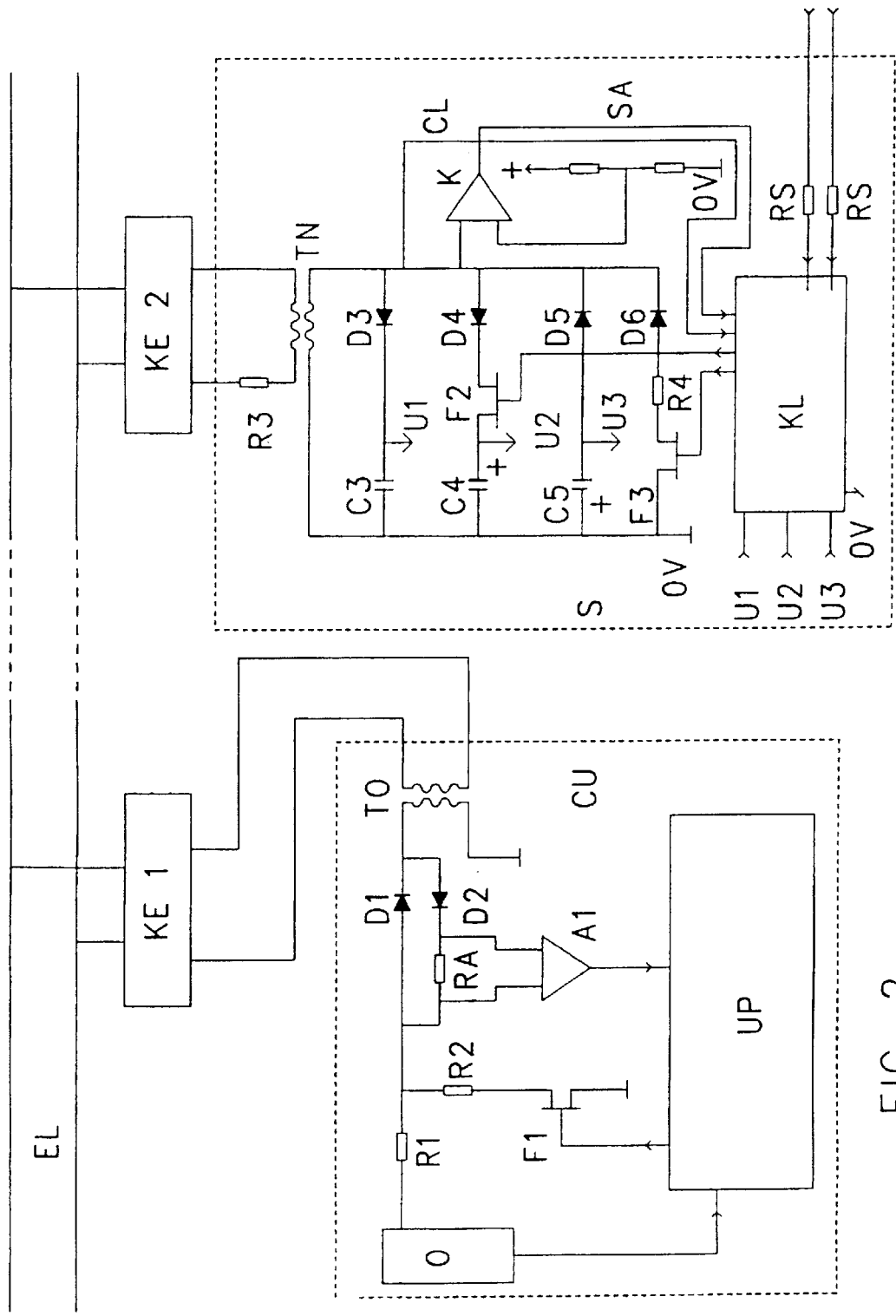
Figure 3:
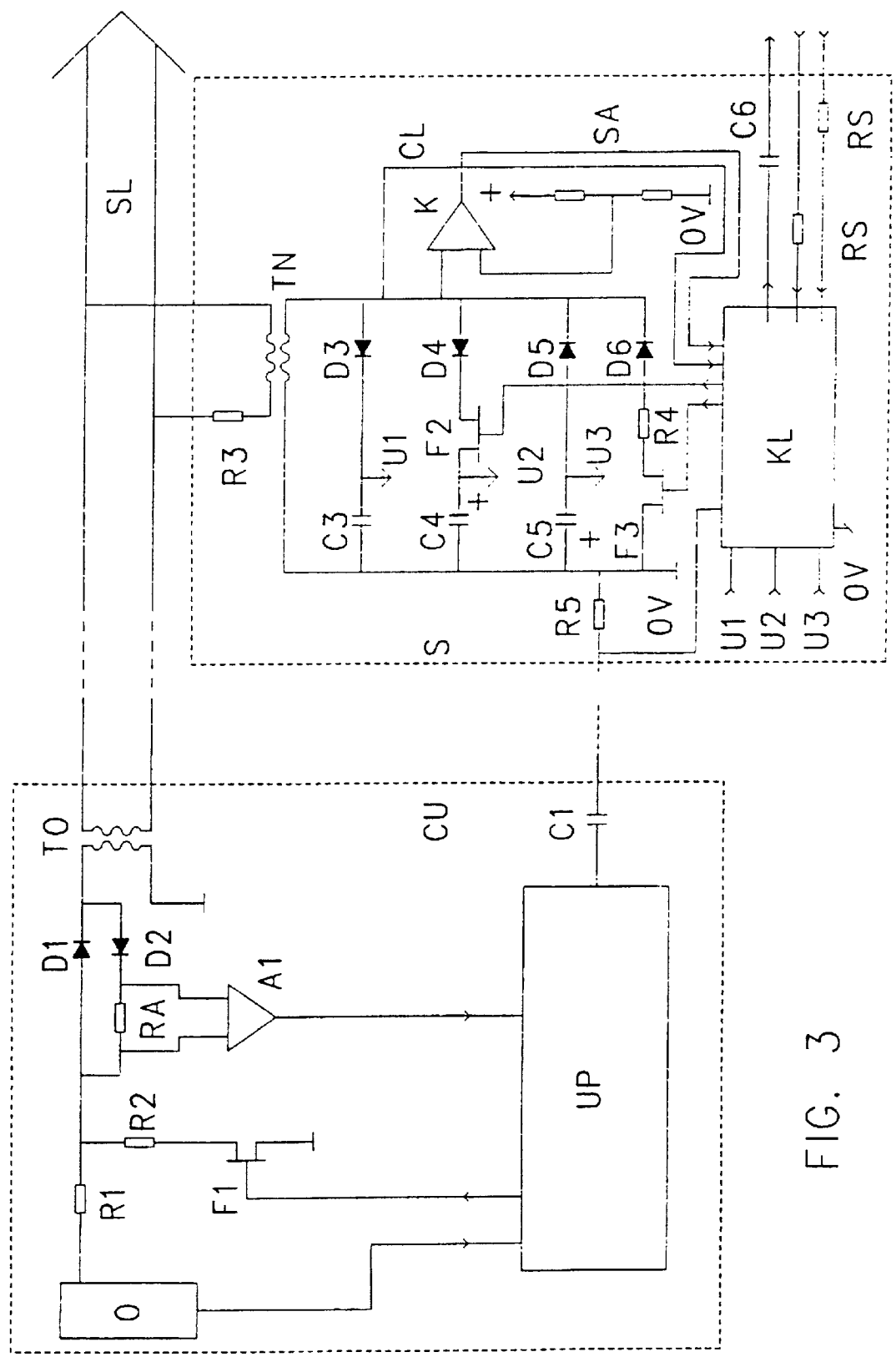
Figure 4:
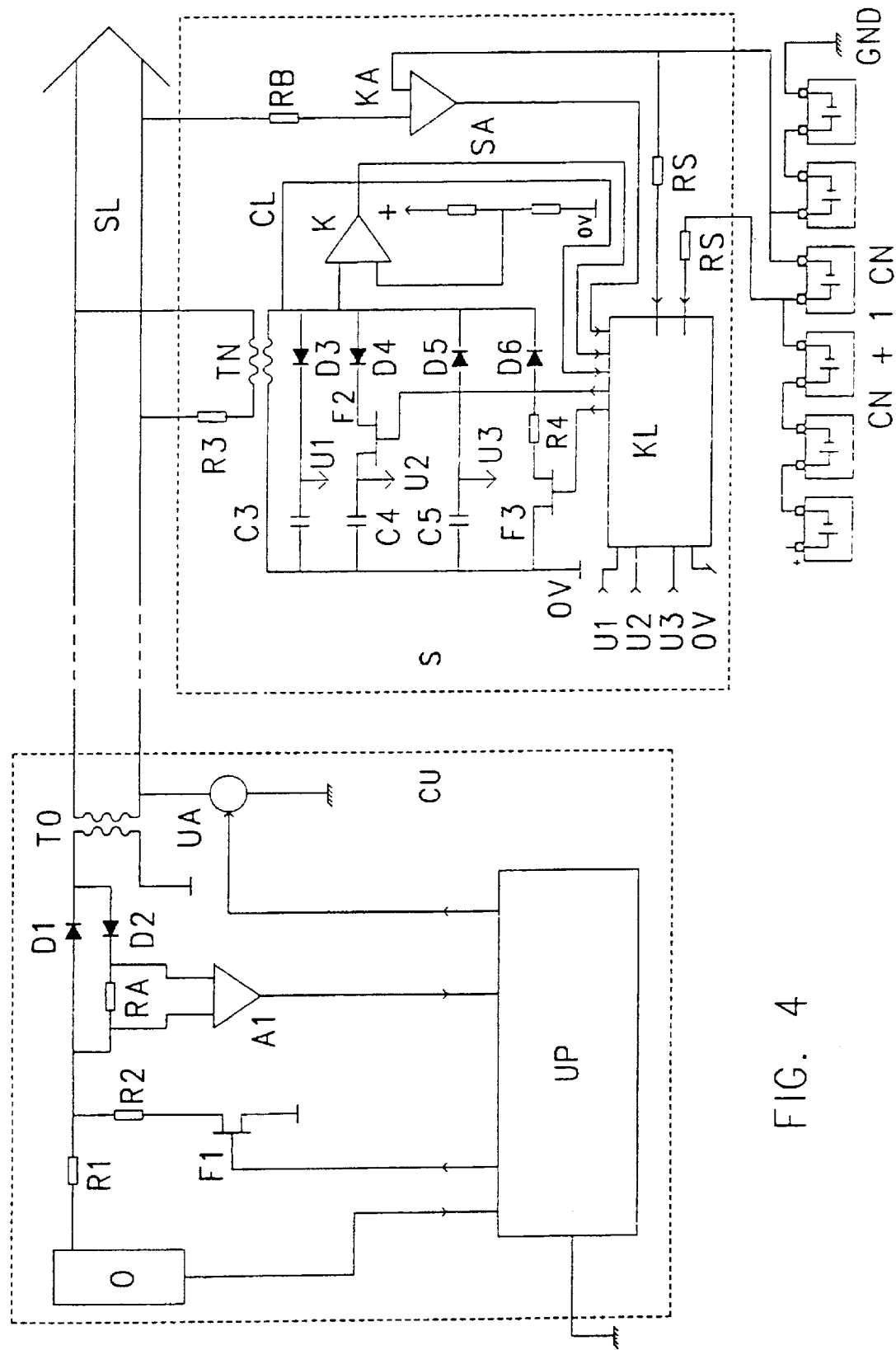

In accordance with the invention a method is provided for two-way data communication such as stated in the appended patent claim 1. Favourable embodiments of the method in accordance with the invention are defined precisely in the appended method claims 2–13. The invention also comprises a system for two-way data communication, and the system is defined precisely in the appended patent claim 14. Further favourable embodiments of the system are indicated in the appended patent claims 15–20. The invention shall now be illuminated further with reference to embodiment examples, and while referring to the appended drawings, where FIG. 1 shows a system in accordance with the invention in an embodiment with galvanic separation between the elements, and where addressing of the single stations takes place by signalling from the central unit, FIG. 2 shows a system where a central unit and stations are connected to a high-voltage power line and uses this line as a signal transmission medium, FIG. 3 shows a system which is rather similar to the system appearing in FIG. 1, however with a third, special line which is used in connection with addressing of the stations, and FIG. 4 shows a system where addressing is made by means of a device for applying a variable DC voltage to the two-wire line.

It is first referred to FIG. 1. The system central unit CU, also referred to as the common group interface, comprises an oscillator O, a voltage divider network R1, R2, and an attached PET switch F1. The switch F1 is controlled from the processor $\mu P$. The oscillator O is also connected to the processor $\mu P$ which uses the signal from the oscillator in connection with timing/synchronizing.

D1 and D2 are diodes facing in opposite directions and connected in parallel, the diode D2 being series connected with a resistor RA. A1 is an amplifier (comparator) for measuring current through RA. In the embodiment appearing in the figure, galvanic separation between the central unit CU and the two-wire line SL is provided by means of a transformer TO. Instead of a transformer one may possibly use two capacitors as a galvanic separation means.

One of the stations connected to the two-wire SL appears in the right hand side of the figure, with reference letter S. The station comprises in the embodiment shown, where galvanic separation is included, a transformer TN, where a resistor R3 is series connected to the primary side Of the transformer. As appears, the station is typically a measuring probe where measurement voltages are received via high-ohmic resistors RS by a control logic circuit KL, which possibly, however not necessarily, is a microprocessor. The control logic circuit KL receives supply voltages U1, U2, U3 from a network which follows the transformer TN. The network comprises diodes and capacitors called D3/C3, D4/C4, D5/C5, respectively. Fences in the shown embodiment the operating power for the station originates in the oscillator O in the group interface CU and is delivered via the line SL. The voltage U2 can be switched off/on by means of the FET switch F2 which is controlled from the control logic circuit KL, in order to obtain an absolute minimum current consumption in the total system.

Further, the oscillator O in the group interface circuit CU provides the system clock frequency, i.e. not only for the processor in the central unit, but also for the stations. The clock frequency can be extracted in a simple manner in each station, and this is shown in the figure by the wire named CL, which leads from the secondary side of the transformer TN to the control logic circuit KL. A phase shift due to TO, TN and the series resistor R3 can be compensated for in a simple manner if necessary.

Several stations can be connected to the same common two-wire line. The maximum number is determined by the required transmission rate, signal/noise ratio and by general requirements regarding a possible EX certification, i.e. if the stations are located in dangerous areas.

Important further elements for back signalling from the station to the central unit, are elements F3, R4 and D6, i.e. respectively a FET switch, a series resistor and a diode. This branch, where the switch is controlled from control logic circuit KL, is connected in parallel with the voltage supply branches comprising C3/D3, C4/D4 and C5/D5.

Correspondingly important for the function is the comparator K, which is arranged to detect a voltage change on the secondary side of transformer TN, with origin in a voltage change in the central unit CU when there is made controlled use of switch F1. The output of comparator K is connected to the control logic circuit KL, and one input thereof is connected to the secondary side of the transformer TN, while the other input is connected to a reference voltage.

The manner of operation for the system is as follows: If a signal is to be transmitted from the central unit or group interface CU in principle to all stations, this is executed by modulating the oscillator signal using the switch F1. It is to be noted at first that the oscillator signal is not necessarily a normal sine oscillation, but it must generally have a periodic character and comprise two opposite polarities within the period. Thus, a typical example of such a signal is a sine oscillation. In principle the signal modulation is made by e.g. changing the amplitude of the positive half period between two, or possibly more, values. The duration of the change can be chosen equal to all of or part of the half period. In the solution shown in FIG. 1, two values are used, the FET switch F1 being switched on and off, thereby causing that the voltage amplitude in the positive half period is at a "high" level when the switch is open, and "low" when the switch is closed. Thus, a digital signal can be transmitted using the positive half periods. (The negative half periods light equally well be chosen for such an outgoing signal from the central unit CU.)

The signal amplitude change will also be present on the secondary side of the transformer TN in each station. The voltage change is detected in the comparator K, which passes digital signals on, corresponding to the signal. entered in switch F1. There are certain restrictions to how many "low" amplitudes that can be transmitted successively in a simple manner, however this poses no problem in the embodiment in question.

Moreover, it can be favourable, in order to achieve minimal changes of the DC voltage component of the signal, to let the amplitude be the same, but with opposite polarity in two half periods. This does not change the fundamental function of the modulation.

Thus, in the embodiment of interest here, the digital signal out from the group interface CU will contain an address of a certain station, and when this address is detected in the addressed station, that particular station, and only that station, wil enter into activity. In this case the station has a pre-programmed identity number in internal storage, i.e. the address, and this identity number is recognized when transmitted from group interface CU. The system then is of a type where only one single station will be in activity at a time. (This can also be realized in other manners, and we shall return to this later.)

When the station S of interest has been activated, it is intended to transmit signals back via the same wire line SL. This occurs in the case shown by making the control logic circuit KL control opening/closing of the FET switch F3, and notably only in the negative half periods for oscillator O (that is when the outgoing signal from the group interface CU utilizes the positive half periods). When the switch F3 is opened/closed, the electrical current in the two-wire line SL varies, and this current change will then be detected in the same negative half periods by investigating the current through resistor RA in the central unit. The duration of the current change can be selected equal to or part of the half period. The current changes are digitized in the amplifier Al which supplies a signal to the central unit processor. Also in this case there are restrictions regarding how many half periods with a large current draw that can be transmitted in succession, but this will not represent a problem for the embodiment in question.

It may be favourable to let the current change be the same, but of opposite polarity in the two half periods, in order to achieve minimal changes of the DC voltage component of the signal. This does not change the principal function of the modulation. In other words, the system can be arranged in such a manner that modulation of one bit into the two-wire line from the central unit lasts one complete period, at the same time as the modulation in return from the station, regarding one bit, also lasts for one complete period. But the information is in principle attached to the voltage amplitude in the "outgoing" signal (in this case starting in a positive half period), and to the current amplitude (starting in a negative half period) in the return signal from the station. Such a methodology will also provide a rather practical solution technically.

In FIG. 2 a somewhat special solution is shown, where the two-wire line SL to be used, is a cable in a high voltage power distribution network, e.g. a 220 volt AC current distribution network. By connecting the transformers TO and TN (the same reference letters/numerals are used regarding corresponding elements from one figure to the next) to the cable SL, via a coupling member KE1, KE2 respectively, it will be possible to use this live cable as a communication line. Moreover, it will be possible to take out operation power from the cable high voltage (not shown), while the data carrying, high frequency voltage from the oscillator O in the group interface CU is used for providing synchronizing signals for timing the functions of the stations.

In FIG. 3 one will note the following difference in relation to what is shown in FIG. 1: An additional and special line has been drawn from the central unit processor AP to the control logic circuit in the first station. Thus, in this case, S is the first of a number of stations. The line is galvanically separated by means of a capacitor C1. Correspondingly, a line has been drawn from the control logic circuit KL in the first staton, to the corresponding control logic in the next station, and galvanic separation has been provided also in this case, by means of a capacitor C6. Apart from a resistor R5 inserted in the station, all remaining elements, identical to what is shown in FIG. 1.

The manner of operation is in this case that the first station shall always respond first. When this first station has finished, it provides an enabling signal to the next station via the line containing capacitor C6. Hence, this type of sequential scanning/interrogation is different from what was stated in the mention of FIG. 1, but for the rest the signalling form between the central unit CU and the station S is the, same, i.e. via the two-wire line SL and by means of modulation of the amplitude of the respective period parts, respectively voltage and current.

In FIG. 4 appears one further form of addressing, and it should be noted that FIG. 4 also is rather similar to FIG. 1, except for the following special features: In FIG. 4 the station S is shown to be a measuring probe which in this case measures the voltage of an accumulator cell CN. Wires from the cell terminals enter the probe control logic circuit KL via high ohmic resistors RS, as previously mentioned.

Thus, in the case shown, the particular station S which appears in the drawing, is connected to one particular accumulator cell, which has a certain potential on one terminal. A next station or measuring probe S will be connected to the next accumulator cell in the row, and will therefore be attached to the (higher) potential oe the next cell, etc. The fact that one certain measuring probe or station S is attached to a certain potential, is utilized in the addressing system appearing here: In the central unit CU there is arranged a DC voltage generator UA, with a negative side connected to safety ground in the figure. Similarly, the negative terminal of the first accumulator cell is connected to safety ground (in principle, only a colon potential is required). The variable DC voltage from generator UA is connected to one of the wires in the two-wire line SL, and thus determines the line potential. It is then possible to compare the line potential to the potential attached to the respective measuring probe S, and this is made by means of a comparator KA which has been introduced in the measuring probe. A series resistor RB is connected in front of one input of comparator KA, while the other input is connected via resistor RS to the accumulator potential corresponding to measuring probe S, i.e. to the negative terminal of accumulator cell CN. A difference signal passes from the comparator KA via line SA to the control logic circuit KL. In circuit XL is then made an evaluation regarding whether the difference between the two potentials lies within a predetermined range, and if so is the case, the station/measuring probe is activated to re-transmit measuring values to the central unit CU. It is thus possible to determine which measuring probe S shall be activated, by regulating the DC voltage provided by the generator UA in the central unit CU, controlled by the central unit processor $\mu$P.

Of course it is not in principle necessary that this is a case of measuring accumulator cells, but an attached, measurable and specific potential for each respective measuring probe or station S is necessary to utilize this manner of addressing.

Thus, a "window" is selected for the control logic circuit, and this circuit will start data transmission when the DC voltage of the two-wire line is in a certain range between negative and positive potential for accumulator cell CN. By increasing the voltage from generator UA gradually from 0 volt and up to the total voltage of the complete accumulator series, each respective measuring probe (which is connected to a respective cell) will receive an activation signal (as well as a de-activation signal). Each measuring probe will therefore only be activated when the DC voltage potential on the two-wire line SL corresponds to the potential to which the measuring probe is connected.

It should be noted that the resistance of resistor RB can be made very large, for example 10 Mohm, so that the small DC current passing from the two-wire line to the measuring probe will not represent any safety risk, while assuring that an accumulator cell area is a typical explosive area.

As mentioned above and previously, an important use of the present invention is just in acquiring measurement data from accumulator cells placed in a collection as a battery of cells in a room classified as explosive. For example in a submarine there say be as many as 200 single cells connected in series, while in emergency power batteries there will often be 24 cells connected in series. Hence, potential differences will appear between the single probes, as high as 48 volt for emergency power batteries, while submarine batteries may reach 4–500 volt DC.

In traditional sensor solutions these potential differences will create large practical and safety-related problems. Further, there will often be a large amount of wiring to be arranged to each respective cell when traditional measuring methodology is used.

There are sensor systems where many measuring probes can be connected to a common data acquiring line. In some of these systems a single probe will take its supply voltage from the cell it is placed together with. In such connections there are two problems. If the measuring probe draws current from the cell in which or together with which it is arranged, it will not be possible to disconnect the measuring probe completely to provide a "dead" state. Being able to achieve such a "dead" state is important in a number of applications, particularly in a submarine, where it is desirable to disconnect all unnecessary electronics to minimize emission of radio signals from the vessel.

It further turns out that a number of problems arise when satisfying the requirements for self-safety. In total it has turned out that the sensor systems developed for such purposes, are far more costly than what users are prepared to pay.

The present invention solves in a practical and above all very inexpensive manner the above mentioned problems. The invention can be implemented at a cost of perhaps only 10–20% of the present systems.

As further safety related considerations in connection with the above statements, the transformer TN which is used at the input of a station/measuring probe, must have an inductance low enough to maintain the requirements for a design which is self-safe. This entails that any DC voltage component in the communication line disappears. For a communication line in its simplest form, without other logic circuits than what has been indicated at the start, possible error detections may arise for special code combinations. In other words: When the comparator A1 in the group interface CU detects a signal in (e.g.) the negative half period, this may be due to either that the previous positive half period was low, or that a measuring probe/station has return signalled with a larger current draw. This phenomenon is due to the fact that transformer TN has an inductance that is too low. However, this problem can be solved in a simple manner, since the processor $\mu$P in the group interface CU actually has knowledge about the amplitude of the last positive half period.

Thus, it is clearly possible to run a full duplex communication on the two-wire line SL, without putting restrictions on what signals are coded. However, microprocessor treatment of the signals will be required on both sides. The processor on each side in the communication has itself knowledge about the signal last transmitted therefrom. Thereby the changing DC voltage states of the signal can be controlled.

By having the resistor R3 inserted between the station transformer TN and the two-wire line, current limiting is obtained. By choosing a correct combination of values of R3, TN and the synchronization frequency, the system will on one hand be able to operate in a quite correct tanner, while when a possible error occurs, it will have a maximum current draw which is limited by the resistor R3. when an error occurs in the measuring probe, this current draw can be made sufficiently low so that the measuring probe may receive an Exi approval without costly safety devices etc. at the input.

By making the control logic circuit KL of the measuring probe. which circuit may very well be a microprocessor, receive measuring values via the series resistors RS which preferably may have a resistance of about 2 Mohm, the measuring probe will also in this regard be able to satisfy the leakage requirement for an Exia approval. In the construction described in FIG. 4, the measuring probe will almost be a "passive" element.

So far the stations have only been examplified as measuring probes. However, a station may also provide outgoing control signals, e.g. for controlling a process. These control signals say e.g. pass to flip-flops, digital/analog converters etc., which are controlled from the control logic circuit of the station, which preferably then is a microprocessor. This microcontroller/microprocessor receives its instructions from the group interface CU according to the general communication system which has already been described.

It is further to be noted that if the signals generated by the oscillator O are sine curves, it will be possible to reduce the emitted electromagnetic waves to a minimum. If the change in the amplitude of the sine signal is made (i.e, opening/losing of switches P1 and F3) when the sine curve passes a zero, the amount of superharmonic frequencies will be reduced to a minimum, and this will reduce emanation strongly.

Finally, a system option for transmitting a message directly from one station (A) to another station (B) shall be described: In a system where all stations are connected continuously and where each station has its own, unique address number, such a communication can be made in the following manner:

Station A transmits a message to the group interface CU and establishes this message as a "mirror" in a certain number of periods of the clock signal. In this period of time the group interface CU will receive the signal entering from the outside in one half period, and retransmit it to the two-wire line in the next half period. Of course, this signal must simultaneously be coded (through a number of "bits") with an addressee, so that the correct station recognises its address.

Morover, it lust be mentioned that synchronization of the central unit CU and the station S with which communication is desirable, can be established in different manners. Techniques known in the field of ordinary serial data communication can be used. Alternatively, a double amplitude change (either from the central unit CU or from the station S) can then be used as a start signal. The point of time when a station is addressed, can also be detected in the central unit through an increased current draw. One has also envisioned the possibility of transmitting a start bit, either from the central unit or from a station, which start bit has a very low amplitude.

What is claimed is:

1. A method for two-way data communication via an electrical two-wire line between a processor controlled central unit and a number of stations each having a logic control unit, where said central unit generates a variable and periodic electrical voltage signal between the two wires, each period of the voltage signal comprising a first and a second period part, the amplitude of the voltage signal during the first and second period parts having opposite polarities, wherein the method is characterized in that said central unit varies the voltage amplitude of a series of first period parts to send an information segment out on the two-wire line, while a station varies the current amplitude correspondingly for a series of second period parts by controlled change of the input impedance of the station, wherein the station uses the variable voltage from the central unit as a power supply voltage and a synchronizing signal for execution and timing of the function of the station, and whereby a return information segment from the station is detected by said central unit by measuring current changes caused by the impedance changes of the station.

2. The method of claim 1, wherein the method is further characterized in that voltage amplitude and current amplitude are changed in a pre-determined time window in each period part in question.

3. The method of claim 1, wherein the method is further characterized in that said central unit generates the same voltage amplitude form in both first and second period parts, and that the impedance change of the station is correspondingly made in full period time units.

4. The method of claim 1 where said two-wire line constitutes a cable in a high voltage power distribution network, and wherein the method is further characterized in that the central unit draws electrical operation power from the cable high voltage.

5. A method for two-way data communication via an electrical two-wire line between a processor controlled central unit and a number of stations each having a logic control unit, where said central unit generates a variable and periodic electrical voltage signal between the two wires, each period of the voltage signal comprising a first and a second period part, the amplitude of the voltage signal during the first and second period parts having opposite polarities, wherein the method is characterized in that said central unit varies the voltage amplitude of a series of first period parts to send an information segment out on the two-wire line, while a station varies the current amplitude correspondingly for a series of second period parts by controlled change of the input impedance of the station, whereby a return information segment from the station is detected by said central unit by measuring current changes caused by the impedance changes of the station, and wherein the station comprises a microprocessor controlled measuring probe for at least one physical parameter, the measuring probe microprocessor holding the station address in store and delivering a response containing measuring data when information transmitted from said central unit contains the address of the station.

6. A method for two-way data communication via an electrical two-wire line between a processor controlled central unit and a number of stations each having a logic control unit, where said central unit generates a variable and periodic electrical voltage signal between the two wires, each period of the voltage signal comprising a first and a second period part, the amplitude of the voltage signal during the first and second period parts having opposite polarities, wherein the method is characterized in that said central unit varies the voltage amplitude of a series of first period parts to send an information segment out on the two-wire line, while a station varies the current amplitude correspondingly for a series of second period parts by controlled change of the input impedance of the station, whereby a return information segment from the station is detected by said central unit by measuring current changes caused by the impedance changes of the station, and wherein each station comprises a measuring probe for at least one physical parameter and a plurality of measuring probes are interrogated successively in such a manner that a first measuring probe receives an activating signal from the central unit on a special activating signal input via a special line, communicates during a pre-determined time period with said central unit, and transmits at expiry of the time period a second activating signal to a corresponding, special activating signal input of a next measuring probe via a special line.

7. A method for two-way data communication via an electrical two-wire line between a processor controlled central unit and a number of stations each having a logic control unit, where said central unit generates a variable and periodic electrical voltage signal between the two wires, each period of the voltage signal comprising a first and a second period part, the amplitude of the voltage signal during the first and second period parts having opposite polarities, wherein the method is characterized in that said central unit varies the voltage amplitude of a series of first period parts to send an information segment out on the two-wire line, while a station varies the current amplitude correspondingly for a series of second period parts by controlled change of the input impedance of the station, whereby a return information segment from the station is detected by said central unit by measuring current chances caused by the impedance changes of the station, and wherein the station comprises a measuring probe for at least one physical parameter, where each station is connected to a certain electrical potential, and wherein the method is further characterized in that the DC voltage potential of the two-wire line is regulated separately by means of a voltage generator which is controlled by said central unit and is connected between one of the wires and a reference point, that a comparator in a logic control unit of the measuring probe determines the difference between the DC voltage of the two-wire line and the certain potential connected to the measuring probe, and that the measuring probe is activated for measuring and communication when said difference lies in a predetermined value range.

8. A method for two-way data communication via an electrical two-wire line between a processor controlled central unit and a number of stations each having a logic control unit, where said central unit generates a variable and periodic electrical voltage signal between the two wires, each period of the voltage signal comprising a first and a second period part, the amplitude of the voltage signal during the first and second period parts having opposite polarities, wherein the method is characterized in that said central unit varies the voltage amplitude of a series of first period parts to send an information segment out on the two-wire line, while a station varies the current amplitude correspondingly for a series of second period parts by controlled change of the input impedance of the station, whereby a return information segment from the station is detected by said central unit by measuring current changes caused by the impedance changes of the station, and wherein each station comprises a microprocessor controlled measuring probe for at least one physical parameter, and where the measuring probes are possibly situated in an explosive or fire-prone environment, and wherein the method is further characterized in that the variable voltage from the central unit is connected to the two-wire line through a galvanic separation means, each station/measuring probe receives the variable voltage through a galvanic separation element, the current between the two wires in the two-wire line being limited by a resistor connected in series with the primary side of the galvanic separation element, and a plurality of high-ohmic series resistors are used on the measuring inputs of the measuring probes to limit measuring current values for safety reasons.

9. The method of claim 1 wherein the method is further characterized in that the periodic voltage signal generated by said central unit is substantially sinusoidal, and that amplitude variation is made both by the central unit and a station with a start in the zeros of the sinusoid.

10. A method for two-way data communication via an electrical two-wire line between a processor controlled central unit and a number of stations each having a logic control unit, where said central unit generates a variable and periodic electrical voltage signal between the two wires, each period of the voltage signal comprising a first and a second period part, the amplitude of the voltage signal during the first and second period parts having opposite polarities, wherein the method is characterized in that said central unit varies the voltage amplitude of a series of first period parts to send an information segment out on the two-wire line, while a station varies the current amplitude correspondingly for a series of second period parts by controlled change of the input impedance of the station, whereby a return information segment from the station is detected by said central unit by measuring current changes caused by the impedance changes of the station, and where the station comprises a process control unit comprising a microcontroller, and wherein the method is further characterized in that the control unit microcontroller delivers control signals to process equipment on the basis of data received from the central unit, and transmits in return process measuring data acquired by attached sensors.

11. A method for two-way data communication via an electrical two-wire line between a processor controlled central unit and a number of stations each having a logic control unit, where said central unit generates a variable and periodic electrical voltage signal between the two wires, each period of the voltage signal comprising a first and a second period part, the amplitude of the voltage signal during the first and second period parts having opposite polarities, wherein the method is characterized in that said central unit varies the voltage amplitude of a series of first period parts to send an information segment out on the two-wire line, while a station varies the current amplitude correspondingly for a series of second period parts by controlled change of the input impedance of the station, whereby a return information segment from the station is detected by said central unit by measuring current changes caused by the impedance changes of the station, and wherein said central unit, when receiving a specially coded data message from a station, enters a reflection operation mode wherein the following modulated second period parts are repeated directly by the central unit for transmission in each successive first period part.

12. The method of claim 11, wherein the method is further characterized in that said reflection operation mode is provided with a duration determined in the coded data message, and that the data communication thereafter taking place from said station under this duration, also comprises an address code which puts one certain of the remaining stations in a response mode.

13. A system for two-way data communication via an electrical two-wire line between a processor controlled central unit and a number of stations each having a logic control unit, optionally also between the stations, where said central unit is adapted to generate a variable and periodic electrical voltage signal between the two wires, each period of the electrical voltage signal comprising a first and a second period part, the amplitude of the voltage signal during the first and second period parts having opposite polarities, wherein the system is characterized in that said central unit comprises a circuit for processor controlled amplitude variation of the voltage signal between the two wires, output data from said central unit being represented by the two-wire voltage signal in a series of first period parts, said central unit further comprising a detection circuit for electrical current in the two-wire line for a current direction corresponding to the polarity of the second period parts, said detection circuit delivering a measuring signal to the processor, each station has an impedance circuit for varying the input impedance of the station as viewed from the two-wire line, said impedance circuit being controlled by the logic control unit of the station, input data to said central unit from a station being represented by the two-wire line current in a series of second period parts, each station comprises at least one network for providing supply voltages for the functions of the station from the two-wire line voltage, and that the logic control unit of the station is synchronized by means of the two-wire line voltage.

14. The system of claim 13, where said two-wire line comprises a cable in a high voltage power distribution network, and the system is further characterized in that said central unit comprises a network for taking a supply voltage from the cable high voltage.

15. A system for two-way data communication via an electrical two-wire line between a processor controlled central unit and a number of stations each having a logic control unit, optionally also between the stations, where said central unit is adapted to generate a variable and periodic electrical voltage signal between the two wires, each period of the electrical voltage signal comprising a first and a second period part, the amplitude of the voltage signal during the first and second period parts having opposite polarities, wherein the system is characterized in that said central unit comprises a circuit for processor controlled amplitude variation of the voltage signal between the two wires, output data from said central unit being represented by the two-wire voltage signal in a series of first period parts, said central unit further comprising a detection circuit for electrical current in the two-wire line for a current direction corresponding to the polarity of the second period parts, said detection circuit delivering a measuring signal to the processor, each station has an impedance circuit for varying the input impedance of the station as viewed from the two-wire line, said impedance circuit being controlled by the logic control unit of the station, input data to said central unit from a station being represented by the two-wire line current in a series of second period parts, each station comprises a measuring probe for at least one physical parameter, and each measuring probe comprises a microprocessor which has a station address in store, and which is adapted to submit a response containing measuring data when information transmitted from said central unit contains the station address.

16. A system for two-way data communication via an electrical two-wire line between a processor controlled central unit and a number of stations each having a logic control unit, optionally also between the stations, where said central unit is adapted to generate a variable and periodic electrical voltage signal between the two wires, each period of the electrical voltage signal comprising a first and a second period part, the amplitude of the voltage signal during the first and second period parts having opposite polarities, wherein the system is characterized in that said central unit comprises a circuit for processor controlled amplitude variation of the voltage signal between the two wires, output data from said central unit being represented by the two-wire voltage signal in a series of first period parts, said central unit further comprising a detection circuit for electrical current in the two-wire line for a current direction corresponding to the polarity of the second period parts, said detection circuit delivering a measuring signal to the processor, each station has an impedance circuit for varying the input impedance of the station as viewed from the two-wire line, said impedance circuit being controlled by the logic control unit of the station, input data to said central unit from a station being represented by the two-wire line current in a series of second period parts, each station comprises a plurality of measuring probes for at least one physical parameter, and between two successive measuring probes there is connected a special activating line for transferring an activating signal from one measuring probe to the next when a predetermined period of time for transmitting information to the central unit has expired, said activating signal activating a corresponding transfer of information for the next measuring probe.

17. A system for two-way data communication via an electrical two-wire line between a processor controlled central unit and a number of stations each having a logic control unit, optionally also between the stations, where said central unit is adapted to generate a variable and periodic electrical voltage signal between the two wires, each period of the electrical voltage signal comprising a first and a second period part, the amplitude of the voltage signal during the first and second period parts having opposite polarities, wherein the system is characterized in that said central unit comprises a circuit for processor controlled amplitude variation of the voltage signal between the two wires, output data from said central unit being represented by the two-wire voltage signal in a series of first period parts, said central unit further comprising a detection circuit for electrical current in the two-wire line for a current direction corresponding to the polarity of the second period parts, said detection circuit delivering a measuring signal to the processor, each station has an impedance circuit for varying the input impedance of the station as viewed from the two-wire line, said impedance circuit being controlled by the logic control unit of the station, input data to said central unit from a station being represented by the two-wire line current in a series of second period parts, each station comprises a measuring probe for at least one physical parameter, and each station is connected to a certain electrical potential, a DC voltage generator which is controlled from said central unit, is connected between one of the wires in the two-wire line and a reference point, for instance ground, the logic control unit of the measuring probe comprises a comparator which receives the two-wire line DC voltage and the certain connected potential of the measuring probe in order to determine the difference therebetween, and the measuring probe is adapted to be activated for measurement and communication when said difference lies in a pre-determined value range.

18. A system for two-way data communication via an electrical two-wire line between a processor controlled central unit and a number of stations each having a logic control unit, optionally also between the stations, where said central unit is adapted to generate a variable and periodic electrical voltage signal between the two wires, each period of the electrical voltage signal comprising a first and a second period part, the amplitude of the voltage signal during the first and second period parts having opposite polarities, wherein the method is characterized in that said central unit comprises a circuit for processor controlled amplitude variation of the voltage signal between the two wires, output data from said central unit being represented by the two-wire voltage signal in a series of first period parts, said central unit further comprising a detection circuit for electrical current in the two-wire line for a current direction corresponding to the polarity of the second period parts, said detection circuit delivering a measuring signal to the processor, each station has an impedance circuit for varying the input impedance of the station as viewed from the two-wire line, said impedance circuit being controlled by the logic control unit of the station, input data to said central unit from a station being represented by the two-wire line current in a series of second period parts, a station comprises a measuring probe for at least one physical parameter, and the measuring probes optionally are situated in an explosive or fireprone environment, a galvanic separation means, is inserted as a transfer member between the central unit and the two-wire line, between said two-wire line and each measuring probe there is arranged a galvanic separation element, where also a current limiting resistor is connected in series with the primary side of said galvanic separation element, and that the measuring inputs of the measuring probes are equipped with high-ohmic series resistors to limit the measuring current values for safety reasons.

\* \* \* \* \*

UNITED STATES PATENT AND TRADEMARK OFFICE
CERTIFICATE OF CORRECTION

PATENT NO. : 6,111,918

DATED : August 29, 2000

INVENTOR(S) : Einar Gotaas

It is certified that error appears in the above identified patent and that said Letters Patent is hereby corrected as shown below:

Col. 2, line 24: Reads: "Fences in the shown"

Should read: --Hence in the shown--

Col. 4, line 18: Reads: "AP to the control logic"

Should read: --$\mu$P to the control logic--

Col. 4, line 49: Reads: "potential oe the next"

Should read: --potential of the next--

Col. 4, line 56: Reads: "only a colon potential is"

Should read: --only a common potential is--

Col. 6, line 29: Reads: "correct tanner,"

Should read: --correct manner--

UNITED STATES PATENT AND TRADEMARK OFFICE
CERTIFICATE OF CORRECTION

PATENT NO. : 6,111,918
DATED : August 29, 2000
INVENTOR(S) : Einar Gotaas

It is certified that error appears in the above-identified patent and that said Letters Patent is hereby corrected as shown below:

Col. 6, line 58:  Reads: "losing of switches P1 and F3)"

Should read: --losing of switches F1 and F3)--

Signed and Sealed this

Fifteenth Day of May, 2001

Attest:

NICHOLAS P. GODICI

Attesting Officer  Acting Director of the United States Patent and Trademark Office